US010207753B2

(12) United States Patent
O'Marra et al.

(10) Patent No.: US 10,207,753 B2
(45) Date of Patent: Feb. 19, 2019

(54) TRAILER FOR HAULING UNIT LOAD DEVICES

(71) Applicant: AET Leasing, LLC, Jeffersonville, IN (US)

(72) Inventors: Richard G. O'Marra, Louisville, KY (US); Lewis Wayne Davis, Buckhannon, WV (US); David G. Roller, Louisville, KY (US); Rodney A. Pack, Dayton, OH (US)

(73) Assignee: AET Logistics, LLC, Jefferson, IN (US)

( * ) Notice: Subject to any disclaimer, the term of this patent is extended or adjusted under 35 U.S.C. 154(b) by 0 days.

(21) Appl. No.: 15/686,368

(22) Filed: Aug. 25, 2017

(65) Prior Publication Data

US 2018/0057081 A1 Mar. 1, 2018

Related U.S. Application Data

(60) Provisional application No. 62/380,028, filed on Aug. 26, 2016.

(51) Int. Cl.
| | | |
|---|---|---|
| *B62D 63/08* | (2006.01) | |
| *B62D 53/06* | (2006.01) | |
| *B60P 1/44* | (2006.01) | |
| *B62D 63/06* | (2006.01) | |

(52) U.S. Cl.
CPC .......... *B62D 53/067* (2013.01); *B60P 1/4421* (2013.01); *B62D 63/06* (2013.01)

(58) Field of Classification Search
CPC .... B62D 53/067; B62D 53/062; B62D 63/06; B60P 1/4421; B60P 1/02; B60P 1/52
See application file for complete search history.

(56) References Cited

U.S. PATENT DOCUMENTS

| | | | | |
|---|---|---|---|---|
| 4,274,789 A | * | 6/1981 | Martin | B60P 1/52 414/501 |
| 4,701,086 A | * | 10/1987 | Thorndyke | B60P 1/02 105/371 |
| 4,881,859 A | * | 11/1989 | Ehrlich | B60P 3/08 280/789 |

(Continued)

FOREIGN PATENT DOCUMENTS

EP 1380457 A2 * 1/2004 .............. B60J 7/102

OTHER PUBLICATIONS

Screenshot of https://www.vaneckgroup.com/en/make-choice/reliable-partner-air-cargo-airline-companies/, printed Jan. 2, 2018.

(Continued)

*Primary Examiner* — James A Shriver, II
*Assistant Examiner* — Steve Clemmons
(74) *Attorney, Agent, or Firm* — Bingham Greenbaum Dell LLP; Brian W. Chellgren; James C. Eaves, Jr.

(57) ABSTRACT

A trailer for carrying unit load devices (ULDs), including unloaded and/or loaded containers and pallets, or other cargo; the trailer designed to be towed on surface streets and highways by conventional motorized truck-tractor units. The trailers are equipped with adjustable decks for supporting ULDs in stacked configuration on the trailer. Using a lowered well portion permits selected ULD stacks to not exceed legal trailer height limits so that additional permitting is not required.

16 Claims, 5 Drawing Sheets

(56) References Cited

U.S. PATENT DOCUMENTS

| | | | | |
|---|---|---|---|---|
| 5,443,350 A * | 8/1995 | Wilson | B60P 1/02 | 410/14 |
| 5,685,228 A * | 11/1997 | Ehrlich | B61D 3/02 | 105/370 |
| 5,915,913 A * | 6/1999 | Greenlaw | B61D 47/00 | 187/267 |
| 5,931,262 A * | 8/1999 | Greenlaw | B61D 47/00 | 187/235 |
| 6,138,579 A * | 10/2000 | Khattab | B60P 3/08 | 105/355 |
| 6,328,525 B1 * | 12/2001 | Greenlaw | B60P 1/02 | 187/244 |
| 6,345,943 B1 * | 2/2002 | Lawson | B60P 3/08 | 410/14 |
| 6,446,561 B1 * | 9/2002 | Khattab | B61D 3/18 | 105/355 |
| 6,485,237 B1 * | 11/2002 | Sandwith | B60P 3/08 | 410/24 |
| 7,114,905 B2 * | 10/2006 | Dibdin | B60P 1/02 | 414/495 |
| 7,475,898 B2 * | 1/2009 | Long | B60P 7/15 | 280/404 |
| 9,090,199 B2 * | 7/2015 | Gunby | B60P 1/433 | |
| 9,199,568 B2 * | 12/2015 | Dibdin | B60P 1/02 | |
| 9,221,501 B2 * | 12/2015 | Lavmand | B60P 1/02 | |
| 2003/0147734 A1 * | 8/2003 | Adams | B60P 1/02 | 414/541 |
| 2017/0267153 A1 * | 9/2017 | Novero | B60P 3/04 | |

OTHER PUBLICATIONS

Screenshot of https://www.vaneckgroup.com/en/make-choice/reliable-partner-air-cargo-airline-companies/eckspressive-7/, printed Jan. 2, 2018.

* cited by examiner

TRAILER FOR HAULING UNIT LOAD DEVICES

This application claims the benefit of priority to U.S. Provisional Patent Application Ser. No. 62/380,028, filed Aug. 26, 2016, for TRAILER FOR HAULING UNIT LOAD DEVICES, incorporated herein by reference.

FIELD

This disclosure relates to trailers for carrying unit load devices (ULDs), including unloaded and/or loaded containers and pallets, or other cargo; the trailer designed to be towed on surface streets and highways by conventional motorized truck-tractor units. The trailers are equipped with adjustable decks for supporting ULDs in stacked configuration on the trailer.

BACKGROUND

ULDs are standard sized containers and pallets commonly used to load luggage or other cargo onto aircraft. ULDs allow quantities of cargo to be bundled into a single unit, simplifying the aircraft loading and unloading process. Ground transportation of ULDs at airports typically occurs by loading ULDs on dollies, and towing the dollies using tugs. Ground transportation of ULDs outside of airports typically occurs by loading ULDs on flatbed trailers towed by conventional motorized truck-tractor units. A typical flatbed trailer is either 48 feet or 53 feet in length, 8 feet and 6 inches in width, and the current lowest legal height limit in any US state without needing a permit is 13 feet 6 inches. Using IATA ULD codes, examples of ULDs follow. Containers which are 125 inches in length and 88 inches wide are the AAD and AAX which are both 96 inches high, the AAZ which is 64 inches high, and the AAY which is 81 inches high. Containers which are 125 inches in length and 96 inches wide are the AMJ and AMA which are both 96 inches high, and the AMX which is 118 inches high. The ALP container is 125 inches long, 61 inches high, and 64 inches high. The AKE container (also known in the industry as a LD3) is 62 inches long, 61 inches wide, and 64 inches high. It is noted that 2 AKE containers can be palletized and netted or strapped thereon, for example on a single PAG or PAH flat pallet with a length of 125 inches and a width of 88 inches, and take up the same space on the trailer as one AAD container. Another flat pallet option is the PMC pallet with a length of 125 inches and a width of 96 inches.

It was realized by the inventors of the present disclosure that improvements in ground transportation for ULDs are needed to increase efficiency and provide other important advantages.

SUMMARY

The disclosed ULD hauling trailers are configured to transport a greater number of ULDs than a conventional flatbed trailer of equal length. The trailers are equipped with adjustable decks for supporting ULDs in stacked configuration on the trailer. Using a lowered well portion permits selected ULD stacks to not exceed legal trailer height limits so that additional permitting is not required.

In some embodiments, the invention comprises a trailer for hauling unit load devices, including a trailer front, a trailer back, a trailed top, a trailer bottom, a trailer left side, and a trailer right side; said trailer having a frame including a base and a plurality of support members; said base having a raised front portion toward said trailer front, a raised back over wheel portion toward said trailer back, and a lowered well portion between said raised front portion and said raised back over wheel portion; said plurality of support members including uprights and hydraulic uprights each extending upward from said base; a fixed front deck portion on said raised front portion, a fixed back deck portion on said raised back over wheel portion, and a movable bottom deck portion on said lowered well portion; at least one movable top deck portion positioned above said moveable bottom deck portion; and opposed pairs of hydraulic jack assemblies, each jack connected to a hydraulic upright, and each opposed pair of hydraulic jack assemblies operably connected to one of said at least one moveable top deck portion.

In further embodiments, the invention comprises a trailer for hauling unit load devices, including a trailer front, a trailer back, a trailed top, a trailer bottom, a trailer left side, and a trailer right side; said trailer having a frame including a base and a plurality of support members; said base having a raised front portion toward said trailer front, a raised back over wheel portion toward said trailer back, and a lowered well portion between said raised front portion and said raised back over wheel portion; said plurality of support members including uprights and hydraulic uprights each extending upward from said base, upper side braces connected atop said uprights and hydraulic uprights and extending along said trailer left and right sides, and upper cross braces extending between said trailer left and right sides, where said upper cross braces are positioned so that a unit load device can be elevated to pass upward between a pair of adjacent upper cross braces; a fixed front deck portion on said raised front portion, a fixed back deck portion on said raised back over wheel portion, and a movable bottom deck portion on said lowered well portion; a movable top front deck portion, a movable top front middle deck portion, a movable top back middle deck portion, said movable top front deck portion, said movable top front middle deck portion, and said movable top back middle deck portion being sequentially aligned and positioned above said movable bottom deck portion; a movable top back deck portion positioned above said fixed back deck portion; opposed pairs of hydraulic jack assemblies, each jack connected to a hydraulic upright, and each opposed pair of hydraulic jack assemblies operably connected to one of said movable top front deck portion, said movable top front middle deck portion, said movable top back middle deck portion, and said movable top back deck portion; additional jack assemblies operably connected to aid movable bottom deck portion to permit movement of said movable bottom deck portion from horizontal alignment with said fixed back deck portion downward toward said base lowered well portion; and, a controller for individually raising and lowering said movable top front deck portion, said movable top front middle deck portion, said movable top back middle deck portion, said movable top back deck portion, and said movable bottom deck portion.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
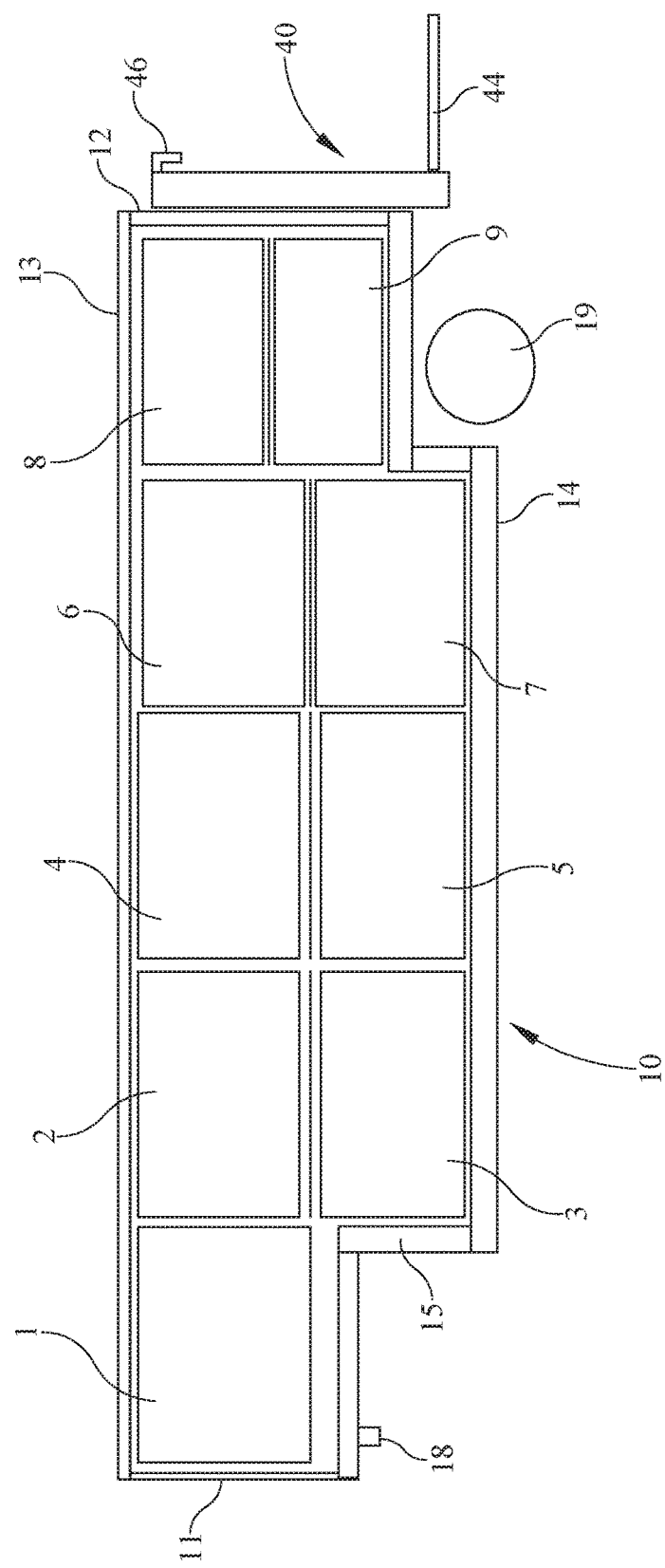
FIG. 1 is a schematic left side view of a ULD hauling trailer showing nine ULDs loaded thereon.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure include a trailer configured to permit the hauling of a plurality of unit load devices, or ULDs, whether containers or pallets, and whether loaded or unloaded. Numbers are used in the drawings and herein to designate the following items: 1, 2, 3, 4, 5, 6, 7, 8, 9—ULD container; 10—trailer; 11—trailer front or nose; 12—trailer back; 13—trailer top; 14—trailer bottom; 15—trailer left side; 16—trailer right side; 18—kingpin; 19—wheels; 20—frame; 22—base; 24—raised front portion; 26—lowered well portion; 28—raised back over wheel portion; 30—support members; 32—uprights; 33—hydraulic uprights; 34—cross braces; 36—upper side braces; 38—upper cross braces; 40—lift gate assembly; 42—hydraulic upright; 44—lift gate; 46—securing member; 50—hydraulic jacks; 51—top front upper jacks (jack 1); 52—top front middle jacks (jack 2); 53—top back middle jacks (jack 3); 54—top back jacks (jack 4); 55, 56, 57—bottom deck/floor jacks; 58—lift gate jacks; 60—decks; 62—fixed front deck portion 64—movable top front deck portion; 66—movable top front middle deck portion; 68—movable top back middle deck portion; 70—movable top back deck portion; 72—movable bottom deck portion; 74—fixed back deck portion; 76—drop in rollers; 78—walkway; 80—hydraulic system for operating hydraulic jacks 50; and 82—user controller for operating hydraulic jacks 50 to raise and lower movable decks 64, 66, 68, 70, 72, and lift gate 44.

Depicted in FIGS. 1 through 6 is a trailer 10 according to one embodiment of the present disclosure. Preferably, trailer 10 is configured to be operable over road without requiring any special permits due to height, width, length, or weight. The eastern and mid-eastern U.S. currently have the lowest non-permitted legal height limit in the U.S. of 13 feet 6 inches, or 162 inches from the ground to the top of the trailer. The rest of the states currently have limits of 14 feet, 14 feet 6 inches, or even 15 feet. So, a trailer with a maximum height of 162 inches is operable in any state without extra permits because of height. Also, trailers designed for operation only in certain states could be increased in height. For example, a trailer for use only in Alaska could have a height of 15 feet without needing a permit for excess height. In general, in addition to height, so as to not require additional permitting, the trailer maximum width should be limited to 8 feet 6 inches, or 102 inches. Also, the decks 60, between the trailer left 15 and right 16 sides, and between the associated hydraulic uprights 33, require a left to right unobstructed distance of 96.5 inches therebetween so as to permit ULDs with a width of up to 96 inches to be moved therealong from the trailer back 12 toward the trailer front 11.

Figure 2:
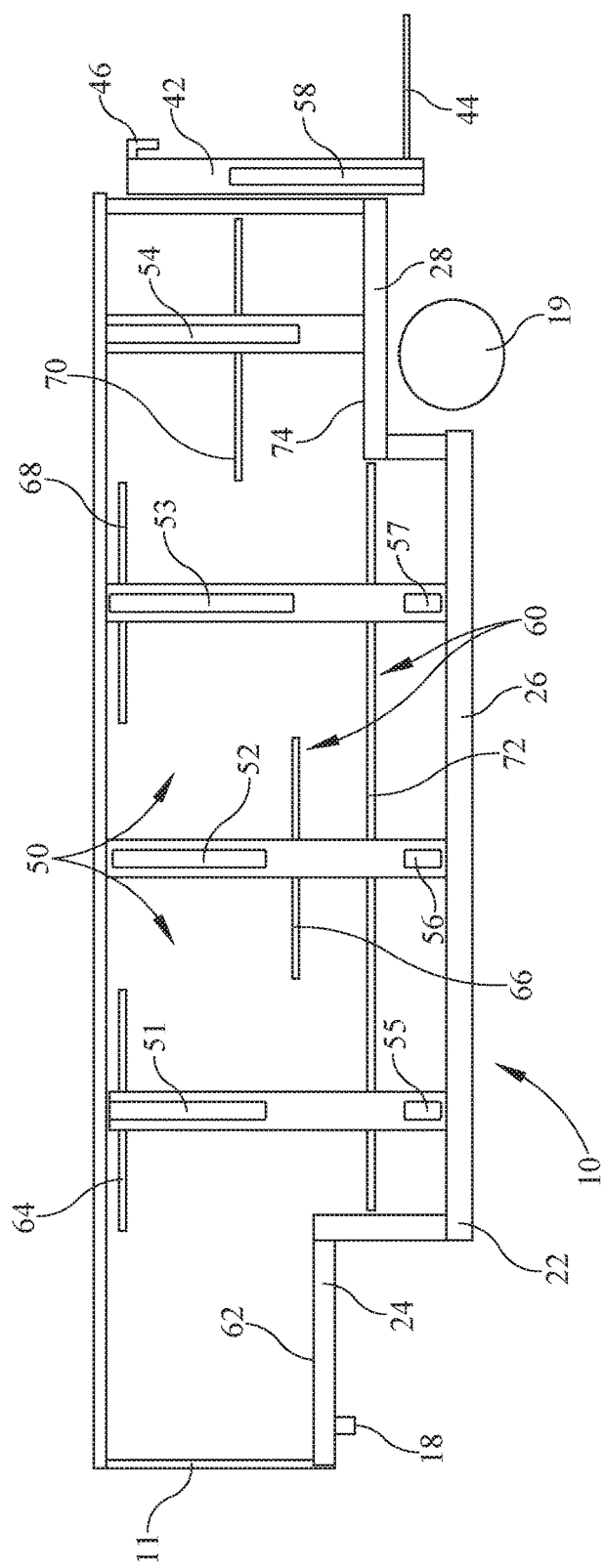
FIG. 2 is a schematic left side view of a frame of a ULD hauling trailer including upright hydraulic jacks for raising and lowering the various decks.
Figure 3:
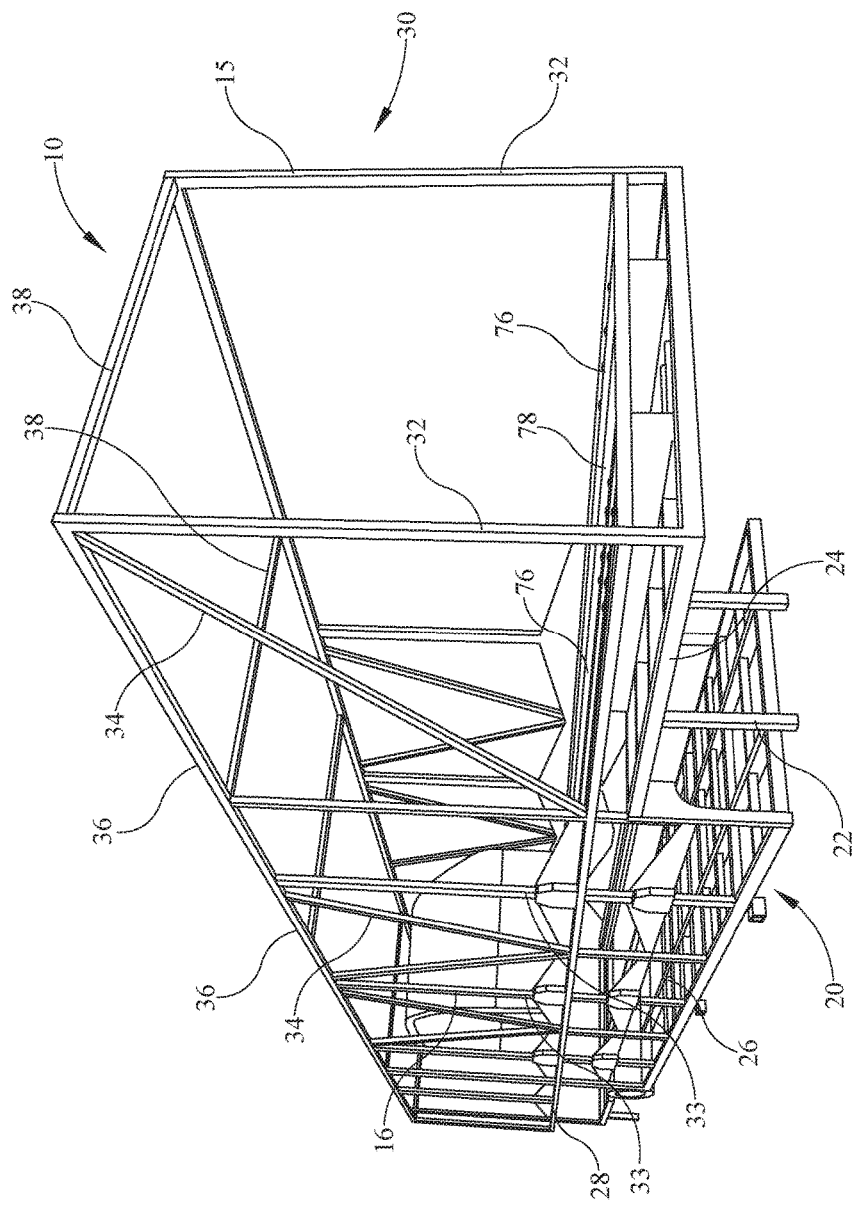
FIG. 3 is a front, right side, perspective view of a ULD hauling trailer frame under construction.
Figure 4:
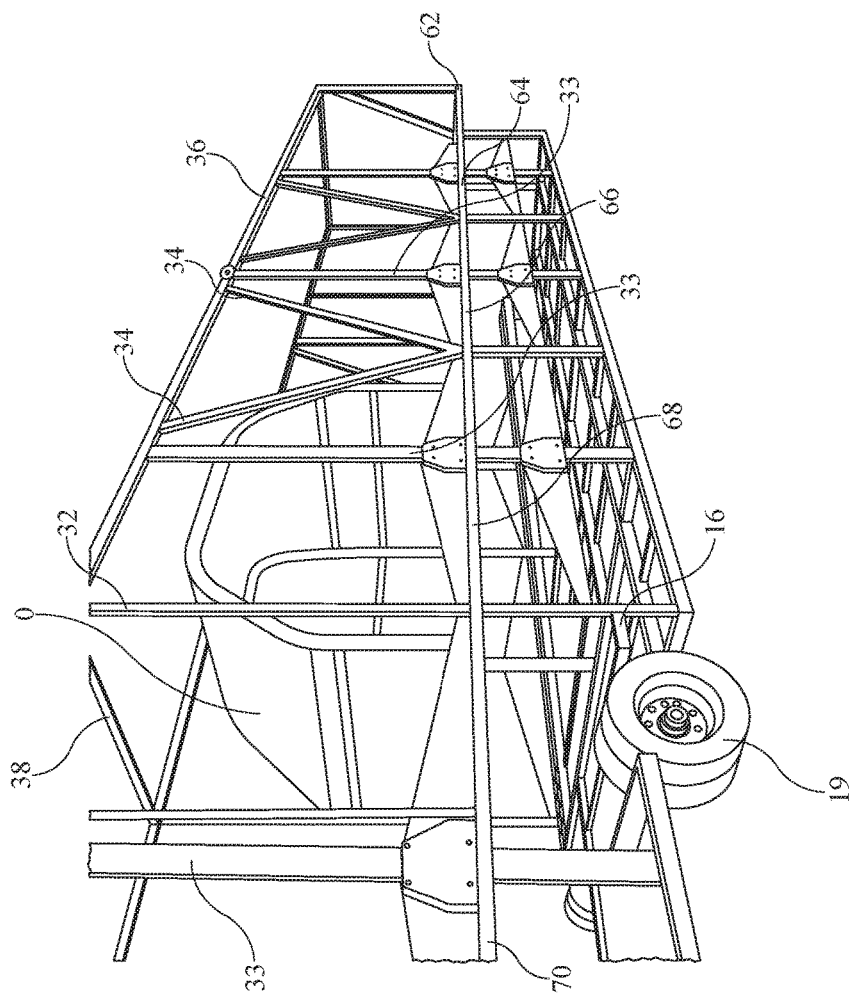
FIG. 4 is a back, right side, perspective view of a ULD hauling trailer frame under construction showing a ULD received on a top deck.

With specific reference to FIGS. 1 and 2, trailer 10 is shown with 11—trailer front; 12—trailer back; 13—trailer top; 14—trailer bottom; 15—trailer left side; 18—kingpin; and 19—wheels. FIGS. 3 and 4 show 16—trailer right side.

FIGS. 1-4 show 20—frame; 22—base; 24—raised front portion; 26—lowered well portion; 28—raised back over wheel portion; 30—support members; 32—uprights; 33—hydraulic uprights; 34—cross braces; 36—upper side braces; 38—upper cross braces; 40—lift gate assembly; 42—hydraulic upright; 44—lift gate; 46—securing member;

50—hydraulic jacks; 51—top front upper jacks (jack 1); 52—top front middle jacks (jack 2); 53—top back middle jacks (jack 3); 54—top back jacks (jack 4); 55, 56, 57—bottom deck/floor jacks; 58—lift gate jacks; 60—decks; 62—fixed front deck portion 64—movable top front deck portion; 66—movable top front middle deck portion; 68—movable top back middle deck portion; 70—movable top back deck portion; 72—movable bottom deck portion; 74—fixed back deck portion; 76—drop in rollers; and 78—walkway.

Figure 5:
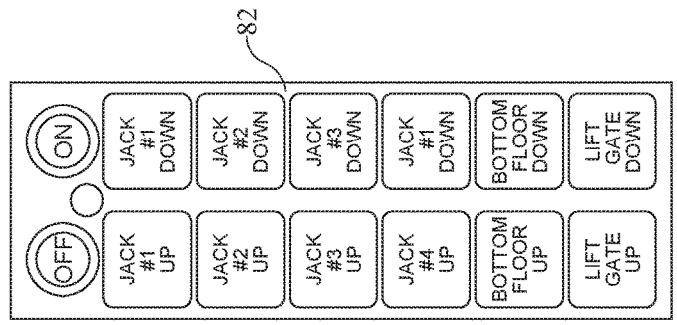
FIG. 5 is a front view of a user controller for operating the various hydraulic jacks for raising and lowering the movable top deck portions, the movable bottom deck portion, and the lift gate.
Figure 6:
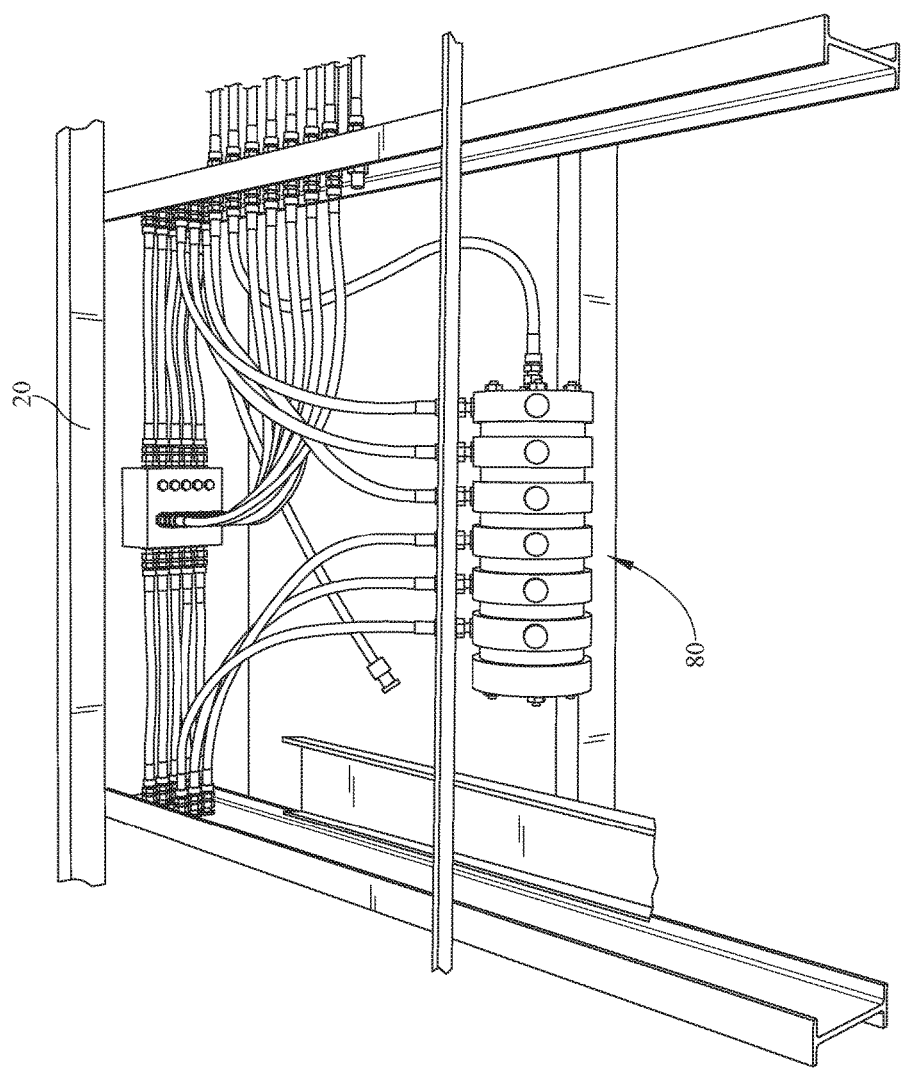
FIG. 6 shows part of the hydraulic system installed on the trailer frame.

FIG. 6 shows 80—hydraulic system for operating hydraulic jacks 50; and FIG. 5 shows 82—user controller for operating hydraulic jacks 50 to raise and lower movable decks 64, 66, 68, 70, 72, and lift gate 44.

The present invention of FIGS. 1-6 is for a trailer 10 for hauling unit load devices (such as identified by the numbers 1-9), the trailer 10 having a trailer front 11, a trailer back 12, a trailed top 13, a trailer bottom 14, a trailer left side 15, and a trailer right side 16. Trailer 10 has a frame 20 including a base 22 and a plurality of support members 30. Base 22 includes a raised front portion 24 toward the trailer front 11, a raised back over wheel portion 28 toward the trailer back 12, and a lowered well portion 26 between the raised front portion 24 and the raised back over wheel portion 28. The plurality of support members 30 including uprights 32 and hydraulic uprights 33 each extending upward from the base 22, upper side braces 36 connected atop the uprights 32 and hydraulic uprights 33 and extending along the trailer left 15 and right 16 sides, and upper cross braces 38 extending between the trailer left 15 and right 16 sides, where the upper cross braces 38 are positioned so that a unit load device (such as identified by numerals 1-9) can be elevated to pass upward between a pair of adjacent upper cross braces 38, so that the upper cross braces 38 do not interfere with that upward movement of the ULD. Decks 60 include a fixed front deck portion 62 on the raised front portion 24, a fixed back deck portion 74 on the raised back over wheel portion 28, and a movable bottom deck portion 72 on the lowered well portion 26. Decks 60 also include a movable top front deck portion 64, a movable top front middle deck portion 66, a movable top back middle deck portion 68, where the movable top front deck portion 64, the movable top front middle deck portion 66, and the movable top back middle deck portion 68 are sequentially aligned and positioned above the movable bottom deck portion 72. Decks 60 even further include a movable top back deck portion 70 positioned above the fixed back deck portion 74. Also, all of the deck 60 portions 62-74 have a plurality of rollers 76 thereon, which permit easy movement of any ULD therealong. The trailer 10 includes opposed pairs of hydraulic jack assemblies 50, each jack 50 connected to a hydraulic upright 33, and each opposed pair of hydraulic jack assemblies 51, 52, 53, 54 operably connected to one of the movable top front deck portion 64 (jacks 51), the movable top front middle deck portion 66 (jacks 52), the movable top back middle deck portion 68 (jacks 53), and the movable top back deck portion 70 (jacks 54). Additional jack assemblies 55, 56, and 57 are operably connected to aid movable bottom deck portion 72 to permit movement of the movable bottom deck portion 72 from horizontal alignment with the fixed back deck portion 74 downward toward the base lowered well portion 24. Even further, included is a controller 82 for individually raising and lowering the movable top front deck portion 64, the movable top front middle deck portion 66, the movable top back middle deck portion 68, the movable top back deck portion 70, and the movable bottom deck portion 72.

Trailer 10 may also have a lift gate assembly 40 attached at the trailer back 12, the assembly 40 including a lift gate 44 movable from a generally horizontal operable position to a generally vertical stowed position, the lift gate being movable upward or downward to permit a unit load device (for example 1-9) to be placed thereon and to then be received into the trailer 10.

Rollers 76 may be drop-in roller sets which are placed toward the trailer 10 left side 15 and right side 16 leaving a walkway 78 therebetween. Walkway 78 will permit individuals to more easily move the ULDs to their desired transport location on trailer 10. It is noted that the ULDs on trailer 10 should be properly secured prior to transport. This may be done, for example, by the use of straps, nets, or physical ULD locks such as those employed to lock ULDs in place on an aircraft.

Loading of a trailer 10 as seen in FIGS. 1 and 2 is explained. Assume that ULD 1 is an AAD container of 125"L, 88"W, and 96"H; ULDs 3, 5, and 7 are AAY containers of 125"L, 88"W, and 81"H; and ULDs 2, 4, 6, 8, and 9 are AAZ containers of 125"L, 88"W, and 64"H. It is noted that an AAY container of height 81" and an AAZ container of height 64" would total 145" if simple stacked atop one another. Looking to the lowered road clearance of the lowered well portion 26 where these containers are stacked and including the dimensions of the movable bottom deck portion 72 and the appropriate one of top deck portions 64, 66, or 68, the two "stacked" AAY and AAZ containers would still be below the legal trailer road height of 162" so that a permit would not be required. One way to load the ULD containers onto trailer 10 is to horizontally align decks 62, 64, 66, 68, and 70. AAD container 1 is then placed onto lift gate 44 and lift gate 44 is then also horizontally aligned with decks 62, 64, 66, 68, and 70. AAD container 1 can then be moved from the trailer back 12 along decks 70, to 68, to 66, to 64, and placed onto deck 62 and preferably secured in place. Next, as desired, movable decks 64, 66, 68, and 70 can be horizontally aligned and spaced so as to permit AAZ containers 2, 4, and 6 to be loaded onto decks 64, 66, and 68. This is accomplished by first placing AAZ container 2 onto lift gate 44 and moving gate 44 so that it is horizontally aligned with deck 70. Container 2 is then moved along deck 70 to deck 68 to deck 66 and to deck 64 and preferable secured thereon. Jacks 51 are then operated using controller 82 to raise deck 64 so that container 2 passes upward through a pair of upper cross braces 38 so that it is not in the way of other containers to be loaded. For example, the location of deck 64 shown in FIG. 2 shows how jack 51 can move deck 64 upward to elevate container 2 thereon upward between cross braces so that containers can be easily loaded below deck 64. Container 4 is to then be loaded the same way as container 2, but onto deck 66, secured thereon, and raised by jacks 52 using controller 82 so that container 4 passes upward through a pair of upper cross braces 38 so that it is not in the way of other containers to be loaded. This process is again repeated to load container 6 onto deck 68, secured thereon, and raised by jacks 53 using controller 82 so that container 6 passes upward through a pair of upper cross braces 38 so that it is not in the way of other containers to be loaded. With decks 64, 66, and 68 loaded and raised to a sufficient height so that containers 3, 5, and 7 can be loaded thereunder, using controller 82, jacks 55, 56, and 57 are operated to move bottom deck portion 72 so that it is in horizontal alignment with fixed back deck portion 74. With that alignment, AAY container 3 is placed on lift 44 and moved into horizontal alignment with deck 74. Container 3 is then moved across deck 74, and along deck 72 until it is positioned under deck 64 having container 2 thereon. Container 3 can then be secured. AAY container 5 is next loaded onto lift 44, aligned horizontally with deck 74 and then container 5 is moved across deck 74 and along deck 72 until it is positioned under deck 66 having container 4 thereon. Container 5 can then be secured. AAY container 7 is next loaded onto lift 44, aligned horizontally with deck 74 and then container 7 is moved across deck 74 and onto deck 72 and positioned under deck 68 having container 6 thereon. Container 7 can then be secured. Controller 82 is then used to operate jacks 55, 56, 57 to lower deck 72 with containers 3, 5, and 7 secured thereon so that deck 72 is moved downward as low as it can go into well portion 26. Next, controller 82 is used to operate jacks 51, 52, and 53, to lower respective deck 64 with container 2 secured thereon, deck 66 with container 4 secured thereon, and deck 66 with container 6 secured thereon as far as they can be lowered considering the location of lowered containers 3, 5, and 7. Finally, AAZ containers 8 and 9 are to be loaded. First, deck 70 can be positioned to receive AAZ container 8. Container 8 can be positioned on lift gate 44 and moved into horizontal alignment with deck 70. Container 8 is moved from lift gate 44 onto deck 70 and secured thereto. Controller 82 is then used to operate jacks 54 and move deck 70 with container 8 thereon upward so that container 8 passes upward through a pair of upper cross braces 38 so that it is not in the way of container 9 to be next loaded. With container 8 up and out of the way, AAZ container 9 is loaded onto lift gate 44 and moved so that it is horizontally aligned with deck 74. Container 9 is moved from lift gate 44 onto deck 74 and secured thereto. Controller 82 is next used to lower deck 70 with container 8 secured thereto as far as it can be lowered considering the location of containers 9, This completes the loading operation of ULD containers 1-9 used in this example. The lift gate 44 is then moved from a generally horizontal position to a generally vertical position and controller 82 is used to operate jack 58 and raise lift gate 44 so that it is secured into securing member 46. Other loading sequences for these one AAD, three AAY, and five AAZ containers are possible because decks 64, 66, and 68 are separate decks and independently operable using their respective jacks 51, 52, and 53. One other option to load these nine containers is to sequentially load ULDs 1, 2, 3, 4, 5, 6, 7, 8, and 9. It is noted that many combinations of ULD loads are possible without exceeding the maximum legal trailer height. A simple alternative example is that, instead of loading a pair of 64" high AAZ containers as containers 8 and 9, a single 118" high AMX container (125"L×96"W× 118"H) can be loaded onto deck 74 and secured thereto.

Various aspects of different embodiments of the present disclosure are expressed in paragraphs X1 and X2 as follows:

X1. One embodiment of the present disclosure includes a trailer for hauling unit load devices, including a trailer front, a trailer back, a trailed top, a trailer bottom, a trailer left side, and a trailer right side; said trailer having a frame including a base and a plurality of support members; said base having a raised front portion toward said trailer front, a raised back over wheel portion toward said trailer back, and a lowered well portion between said raised front portion and said raised back over wheel portion; said plurality of support members including uprights and hydraulic uprights each extending upward from said base; a fixed front deck portion on said raised front portion, a fixed back deck portion on said raised back over wheel portion, and a movable bottom deck portion on said lowered well portion; at least one movable top deck portion positioned above said moveable bottom deck portion; and opposed pairs of hydraulic jack assemblies, each jack connected to a hydraulic upright, and each opposed pair of hydraulic jack assemblies operably connected to one of said at least one moveable top deck portion.

X2. Another embodiment of the present disclosure includes a trailer for hauling unit load devices, including a trailer front, a trailer back, a trailed top, a trailer bottom, a trailer left side, and a trailer right side; said trailer having a frame including a base and a plurality of support members; said base having a raised front portion toward said trailer front, a raised back over wheel portion toward said trailer back, and a lowered well portion between said raised front portion and said raised back over wheel portion; said plurality of support members including uprights and hydraulic uprights each extending upward from said base, upper side braces connected atop said uprights and hydraulic uprights and extending along said trailer left and right sides, and upper cross braces extending between said trailer left and right sides, where said upper cross braces are positioned so that a unit load device can be elevated to pass upward between a pair of adjacent upper cross braces; a fixed front deck portion on said raised front portion, a fixed back deck portion on said raised back over wheel portion, and a movable bottom deck portion on said lowered well portion; a movable top front deck portion, a movable top front middle deck portion, a movable top back middle deck portion, said movable top front deck portion, said movable top front middle deck portion, and said movable top back middle deck portion being sequentially aligned and positioned above said movable bottom deck portion; a movable top back deck portion positioned above said fixed back deck portion; opposed pairs of hydraulic jack assemblies, each jack connected to a hydraulic upright, and each opposed pair of hydraulic jack assemblies operably connected to one of said movable top front deck portion, said movable top front middle deck portion, said movable top back middle deck portion, and said movable top back deck portion; additional jack assemblies operably connected to aid movable bottom deck portion to permit movement of said movable bottom deck portion from horizontal alignment with said fixed back deck portion downward toward said base lowered well portion; and, a controller for individually raising and lowering said movable top front deck portion, said movable top front middle deck portion, said movable top back middle deck portion, said movable top back deck portion, and said movable bottom deck portion.

Yet other embodiments include the features described in any of the previous paragraphs X1 and X2, as combined with one or more of the following aspects:

Wherein at least one of said deck portions having a plurality of rollers thereon.

Additional jack assemblies operably connected to aid movable bottom deck portion to permit movement of said movable bottom deck portion from horizontal alignment with said fixed back deck portion downward toward said base lowered well portion.

Wherein said plurality of support members further include upper side braces connected atop said uprights and hydraulic uprights and extending along said trailer left and right sides, and upper cross braces extending between said trailer left and right sides Wherein said upper cross braces are positioned so that a unit load device can be elevated to pass upward between a pair of adjacent upper cross braces.

A lift gate assembly attached at said trailer back, said assembly including a lift gate movable from a generally horizontal operable position to a generally vertical stowed position, said lift gate being movable upward or downward to permit a unit load device to be placed thereon and to then be received into said trailer.

A controller for individually raising and lowering said movable top front deck portion, said movable top front middle deck portion, said movable top back middle deck portion, said movable top back deck portion, and said movable bottom deck portion.

Wherein the at least one movable top deck portion includes a movable top front deck portion, a movable top front middle deck portion, and a movable top back middle deck portion, said movable top front deck portion, said movable top front middle deck portion, and said movable top back middle deck portion being sequentially aligned and positioned above said movable bottom deck portion.

Wherein each opposed pair of hydraulic jack assemblies is operably connected to one of said movable top front deck portion, said movable top front middle deck portion, and said movable top back middle deck portion.

A movable top back deck portion positioned above said fixed back deck portion.

Wherein an opposed pair of hydraulic jack assemblies is operably connected to said movable top back deck portion.

Wherein said deck portions have a plurality of rollers thereon.

Wherein said plurality of rollers on said deck portions are positions toward said trailer left and right sides leaving a walkway therebetween.

Wherein said lift gate is movable upward or downward using said controller.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

The invention claimed is:

1. A trailer for hauling unit load devices, comprising:
   a trailer front, a trailer back, a trailer top, a trailer bottom, a trailer left side, and a trailer right side;
   said trailer having a frame including a base and a plurality of support members;
   said base having a raised front portion toward said trailer front, a raised back over wheel portion toward said trailer back, and a lowered well portion between said raised front portion and said raised back over wheel portion;
   said plurality of support members including uprights and hydraulic uprights each extending upward from said base;
   a fixed front deck portion on said raised front portion, a fixed back deck portion on said raised back over wheel portion, and a movable bottom deck portion on said lowered well portion;
   at least one movable top deck portion positioned above said moveable bottom deck portion;
   a movable top back deck portion positioned above said fixed back deck portion, said movable top back deck portion, said at least one movable top deck, and said moveable bottom deck portion each being independently operable; and
   opposed pairs of hydraulic jack assemblies, each jack connected to a hydraulic upright, and each opposed pair of hydraulic jack assemblies operably connected to one of said at least one moveable top deck portion.

2. The trailer of claim 1, wherein at least one of said deck portions having a plurality of rollers thereon.

3. The trailer of claim 1, further comprising additional jack assemblies operably connected to aid movable bottom deck portion to permit movement of said movable bottom deck portion from horizontal alignment with said fixed back deck portion downward toward said base lowered well portion.

4. The trailer of claim 1, wherein said plurality of support members further include upper side braces connected atop said uprights and hydraulic uprights and extending along said trailer left and right sides, and upper cross braces extending between said trailer left and right sides.

5. The trailer of claim 4, wherein said upper cross braces are positioned so that a unit load device can be elevated to pass upward between a pair of adjacent upper cross braces.

6. The trailer of claim 1, further comprising a lift gate assembly attached at said trailer back, said assembly including a lift gate movable from a generally horizontal operable position to a generally vertical stowed position, said lift gate being movable upward or downward to permit a unit load device to be placed thereon and to then be received into said trailer.

7. The trailer of claim 1, wherein the at least one movable top deck portion includes a movable top front deck portion, a movable top front middle deck portion, and a movable top back middle deck portion, said movable top front deck portion, said movable top front middle deck portion, and said movable top back middle deck portion being sequentially aligned and positioned above said movable bottom deck portion.

8. The trailer of claim 7, further comprising a controller for individually raising and lowering said movable top front deck portion, said movable top front middle deck portion, said movable top back middle deck portion, said movable top back deck portion, and said movable bottom deck portion.

9. The trailer of claim 7, wherein each opposed pair of hydraulic jack assemblies is operably connected to one of said movable top front deck portion, said movable top front middle deck portion, and said movable top back middle deck portion.

10. The trailer of claim 1, wherein an opposed pair of hydraulic jack assemblies is operably connected to said movable top back deck portion.

11. The trailer of claim 1, wherein said plurality of support members further includes upper cross braces extending between said trailer left and right sides, where said upper cross braces are positioned so that a unit load device can be elevated to pass upward between a pair of adjacent upper cross braces.

12. A trailer for hauling unit load devices, comprising:
    a trailer front, a trailer back, a trailed top, a trailer bottom, a trailer left side, and a trailer right side;
    said trailer having a frame including a base and a plurality of support members;
    said base having a raised front portion toward said trailer front, a raised back over wheel portion toward said trailer back, and a lowered well portion between said raised front portion and said raised back over wheel portion;

said plurality of support members including uprights and hydraulic uprights each extending upward from said base, upper side braces connected atop said uprights and hydraulic uprights and extending along said trailer left and right sides, and upper cross braces extending between said trailer left and right sides, where said upper cross braces are positioned so that a unit load device can be elevated to pass upward between a pair of adjacent upper cross braces;

a fixed front deck portion on said raised front portion, a fixed back deck portion on said raised back over wheel portion, and a movable bottom deck portion on said lowered well portion;

a movable top front deck portion, a movable top front middle deck portion, a movable top back middle deck portion, said movable top front deck portion, said movable top front middle deck portion, and said movable top back middle deck portion being sequentially aligned and positioned above said movable bottom deck portion;

a movable top back deck portion positioned above said fixed back deck portion;

opposed pairs of hydraulic jack assemblies, each jack connected to a hydraulic upright, and each opposed pair of hydraulic jack assemblies operably connected to one of said movable top front deck portion, said movable top front middle deck portion, said movable top back middle deck portion, and said movable top back deck portion;

additional jack assemblies operably connected to aid movable bottom deck portion to permit movement of said movable bottom deck portion from horizontal alignment with said fixed back deck portion downward toward said base lowered well portion; and, a controller for individually raising and lowering said movable top front deck portion, said movable top front middle deck portion, said movable top back middle deck portion, said movable top back deck portion, and said movable bottom deck portion wherein each of said movable bottom deck portion, said movable top front deck portion, said movable top front middle deck portion, said movable top back middle deck portion, and said movable top back deck portion are independently operable.

13. The trailer of claim 12, wherein said deck portions have a plurality of rollers thereon.

14. The trailer of claim 13, wherein said plurality of rollers on all of said deck portions are positions toward said trailer left and right sides leaving a walkway therebetween.

15. The trailer of claim 12, further comprising a lift gate assembly attached at said trailer back, said assembly including a lift gate movable from a generally horizontal operable position to a generally vertical stowed position, said lift gate being movable upward or downward to permit a unit load device to be placed thereon and to then be received into said trailer.

16. The trailer of claim 15, wherein said lift gate is movable upward or downward using said controller.

\* \* \* \* \*